Dec. 1, 1964  V. G. YOST  3,158,921
CUTTING-OFF TOOL
Filed April 19, 1963  3 Sheets-Sheet 1

INVENTOR.
Victor G. Yost
BY Green, McCallister & Miller
HIS ATTORNEYS

Dec. 1, 1964   V. G. YOST   3,158,921
CUTTING-OFF TOOL
Filed April 19, 1963   3 Sheets-Sheet 2

INVENTOR.
Victor G. Yost
BY *Green, McCallister & Miller*
HIS ATTORNEYS

INVENTOR.
Victor G. Yost
BY Green, McCallister & Miller
HIS ATTORNEYS

United States Patent Office 3,158,921
Patented Dec. 1, 1964

3,158,921
CUTTING-OFF TOOL
Victor G. Yost, Irwin, Pa., assignor to Firth Sterling, Inc., Pittsburgh, Pa., a corporation of Pennsylvania
Filed Apr. 19, 1963, Ser. No. 274,141
18 Claims. (Cl. 29—96)

This invention relates to a cutting-off tool and particularly to a tool which has to operate within relatively limited space requirements and, after a forward cutting operation has been accomplished, is to be withdrawn from the material of the working cut.

An important phase of the invention relates to a cutting-off tool which will be suitable for an automatic machine such as used in cutting-off or grooving a workpiece such as a pipe member, or such as used for trepanning where, for example, the machine does not permit flexibility of side to side movement of the tool with respect to the workpiece.

Heretofore, to the best of my knowledge, tools used for cutting-off operations have been of a unitary construction, in the sense of employing a brazed-on carbide cutting tip at the end of a steel shank. When a tool is used in a cutting-off operation, I have found that after the plunge cut grooving or actual parting of the workpiece, there is a tendency for the tool and particularly its carbide tip to bind in the reverse, withdrawal or backward movement from the workpiece, and that this is due to the elastic nature of the metal, such as of the steel that is being cut. That is, the material or workpiece will expand as a result of the cutting operation and present interference from the standpoint of withdrawal or backing-out of the tool from the cut. Even when a grooving operation is being accomplished, the cutting includes some deformation of the metal of the workpiece which causes it to spring-back when the cutting edge passes a given point or area, and although this elastic action of the workpiece may only amount to a few thousandths of an inch, it causes a binding effect on at least one side of the tool. This occurs in connection with a complete cutting-off operation. In a grooving operation, a binding effect is produced on both sides of the tool.

Heretofore, it has been customary to decrease the thickness of the tool shank backwardly from the cutting tip toward the back mounting part of the tool in order to provide some clearance in the withdrawing operation. However, due to space limitations and other considerations, the maximum angular slope of backward convergence of the shank has been limited to about 1½ degrees, and even with this maximum, such a construction provides a weak connecting neck portion between the shank and the mounting body of the tool, since its thickness is at a minimum at this point or area. With automatic machines, even utilizing the maximum allowable back convergence of the tool shank, I have found that there is still a tendency for the tool to bind and cause trouble.

Heretofore, as above indicated, commercial practice has made use of a brazed-on carbide tip for cutting-off operations. Due to the nature of the forces which are set up during a cutting-off operation and the withdrawal of the tool, as is customary where a cutting tip is provided with a front angle for effecting the cutting operation, uneven forces are set up on the tip, tending to produce a sidewise or lateral force or movement of it with respect to the tool holder. Since withdrawal of the tool tip tends to set up such a type of binding force action, there is a tendency to break the carbide tip away from the shank of the tool holder and to cause failure of the tool holder, particularly along its thin maximum relief area or neck of minimized thickness.

In ordinary cutting operations, such as involved in a surface cut of a workpiece (planing or machining), the use of clamped-on, throw-away carbide tips has been found to be satisfactory. However, in operations, such as above described, they have been found to be totally impractical. The use of tools having brazed-on tips involves the need for periodically either replacing the tools as a whole, particularly where different types or sizes of cuts are to be made, or of removing the carbide tip and replacing it or regrinding it and then again brazing it on the tool shank. This is a time-consuming and expensive operation and makes it necessary to provide tool tips which are diamond ground for maximum accuracy of brazed-on fitting. In highly automatic cutting-off machines, the set-up cost will run up to $100 per hour. Thus, when it takes about 5 to 10 minutes or more to measure, align, tighten-down accurately, and position a brazed-on cutting element in place, if, as made possible by my invention, a removable tip can be accurately positioned and removably secured in position on a tool holder shank within less than about 30 seconds, the total cost of the change-over and of the removable cutting element combined will be a small fraction of the set-up cost alone of a brazed-on element. It will be noted that the tool holder is pulled out to position a brazed tip and that this is not necessary to position an insert or removable type of tip. The heat of the brazing operation also tends to damage adjacent areas of the tool shank and thus weaken it. Flexibility of substituting different size tips for different types or sizes of operations is lacking, thus requiring a large stock bin or storage area.

It has thus been an object of my invention to devise a new and improved type of cutting tool which will be suitable for cutting-off operations and which will eliminate the difficulties heretofore encountered with conventional tools of this nature;

Another object has been to make possible the provision of a strengthened and strength-retaining longer life tool holder which can be used in a number of operations involving different types of cutting tips;

Another object of my invention has been to make possible the practical utilization of a clamped-on or easily-removable and adjustable type of cutting tip in a tool used for cutting-off and similar operations, and particularly in operations where tool introduction and withdrawal would ordinarily be hampered by space limitations and lack of clearance flexibility of the machine being used;

A further object of my invention has been to provide a new and improved form of cutting tip for an operation of the type here involved, and to make possible the use of a chip-breaker therewith and without the necessity of machining-away the shank of the tool under the tip to provide necessary relief;

A further object of my invention has been to devise a new and improved operating combination for cutting-off and similar types of operations which will provide a greater tool life and will result in the elimination of difficulties heretofore encountered in operations of such a type;

These and other objects of my invention will appear to those skilled in the art from the illustrated embodiments of my invention and the claims.

Figure 1:
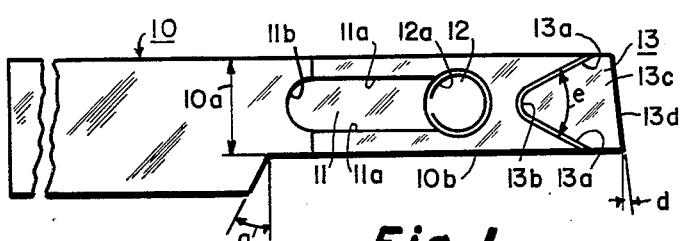
FIGURE 1 is a top plan view illustrating a tool holder constructed in accordance with my invention.

Although for the purpose of illustration I have shown my invention as employed with a tool holder shank or body, it will be apparent that its principles may also be applied to a metal cutting wheel provided with cutting tips about its periphery. In such a utilization, the cutting edges of the individual tips may be held in different positioned relationships or varied as to angular positioning along the periphery of the wheel to provide a maximum efficiency of cutting action and chip removal.

In carrying out my invention, I have not only been able to eliminate the necessity for necking-in or thinning the shank of the tool body to provide withdrawal clearance, the expense of and need for a diamond wheel grinding operation to finish the cutting tip, and the time-consuming operations in changing and adjusting brazed-on tips, but have also been able to make possible the use of a heat-treated steel shank tool holder of greater strength and rigidity which will retain its as-heat-treated characteristics. I have been able to make possible the use and ready replacement of tips of different characteristics, as needed for particular material cutting operations, and without requiring a plurality of different shapes of tool holders. It is no longer necessary to depend upon a further increase of depth or transverse extent of tool shank, in order to maintain its strength within reasonable limits, particularly adjacent the machined-off, side-relief areas. I also cut down in the initial cost of tools and eliminate the necessity for regrinding and rebrazing cutting tips.

I have been able to employ a separate or clamped-on carbide cutting tip by providing it with a back end portion of converging angular shape which has a wedging engagement or fit with somewhat complementary side walls of the holder above its shelf or holding ledge. This type of mounting fully supports the cutting element against unequal, side-exerted forces during insertion and removal of the tool and, in combination with a wedge fit between the bottom face of the cutting element and the top face of the ledge or supporting shelf of the holder, makes possible the secure and full retention of the cutting element in position on the holder when the tool is inserted into a cutting position and particularly, when it is being withdrawn therefrom after the completion of a cutting operation. As to the latter feature, the underface or surface of the cutting tip is provided with a backwardly-outwardly, downwardly sloped surface which cooperates in a complementary manner with a backwardly-depressed or sloping face of the shelf support.

By employing such a combination and suitable angular relationships, I have been able to make practical the utilization of removable or clamped-on cutting elements and to eliminate the necessity for brazed-on tips, as well as the provision of relief areas along the sides of the tool shank. I have found that a carbide tip constructed and mounted in accordance with my invention will have an effective operating life that is up to 50% greater than that of a conventional brazed-on tip. In this connection, as cutting operations are effected, a wear land will tend to develop on the top or forward cutting edge of the tip which will then wear down and be repeated. However, I discovered that there is greater wear on the vertical side edge or corner than on the top cutting edge, since this edge or corner is forcibly rubbed during a cutting-off operation. The side rubbing action produces a wear land on such a side edge. However, using my construction, frictional heat generated in the cutting tip and general wear and tear is decreased and the land build-up is much smaller or lesser than in a brazed-on tip.

As to the back end portion of the cutting tip, the included angle defined by the opposed converging sides may be within a range of about 30° to 90°, with about 60° as an optimum. The 60° optimum will, of course, provide an individual angular relationship of each angular side of about 30°.

It has been customary in ordinary cutting tools to use a separate chip-breaker element in combination with a removable cutting tip. This has the disadvantage of increasing the number of parts, complicating the assembly, etc. For example, the chip-breaker may become lost by dropping away, particularly where the tool is being used in an upside-down position in a machine. I have further improved the operation of my tool by, in effect, forming an integral chip-breaker on the cutting element, itself. When cutting or machining harder materials, the chip-breaker shoulder may be closer to the cutting edge and for softer materials it may be moved back more. Further, the front cutting face of the cutting element may be provided with any suitable cutting edge design for a particular type of operation.

In addition, a finish grind on the tip element is not necessary, in order to provide it with a suitable seated relationship. In this connection, a carbide tip can be used in an as sintered condition, since its mounting is not a close tolerance operation, as in the case of a brazed-on tip. It is only necessary to diamond grind the cutting edge where a fine, finished cut is desired. As distinguished from prior tools, the cutting tip element, itself, provides the clearance necessary for the back movement of the tool and makes possible a greater angle of clearance than heretofore practical from the standpoint of a brazed tip where the clearance has to be made along the sides of the shank. In this connection, the side angle clearance may as an optimum be about 3°, as distinguished from the previous limitations of 1½°. This, of course, decreases wear and tear on the tool construction in its use. A range of up to about 5° to 6° of an angular relation is now practical for facilitating the withdrawal of the tool.

Summarized, some of the advantages of my construction are that it eliminates expensive setting-up operations including the time heretofore consumed in changing and adjusting brazed-on cutting off tools, and eliminates costly grinding of the cutting elements of brazed tools and thus cuts down on diamond wheel costs. It provides uniform chip-breaking characteristics, since the chip-breaker is molded or finished in the cutting element insert. It makes possible the cutting down of storage space and inventory of brazed tools, since various shapes of cutter elements can be substituted in a given tool holder. It eliminates the need for special high temperature brazing set-ups and tool repair shops at companies that braze-on their own tools, eliminates damage to the cutting tip due to brazing strains and grinding heat checks, and enables the provision of a heat-treated steel shank of greater strength and rigidity which will retain its characteristics. Finally, a used cutting insert can be replaced with a new one in a matter of seconds, even where the tool holder is used upside down, since a clamping block, head or holder element having a pin and hole alignment or tongue and groove slide mounting on the tool shank is employed with a threaded screw of minimized head extension to clamp a combined cutting and chip breaker element in a desired cutting position and retain it in such position, even when the holder is slightly loosened, and since, when the clamping element is loosened sufficiently, the cutting element may be replaced without having to assemble a large group of parts or elements.

Figure 2:
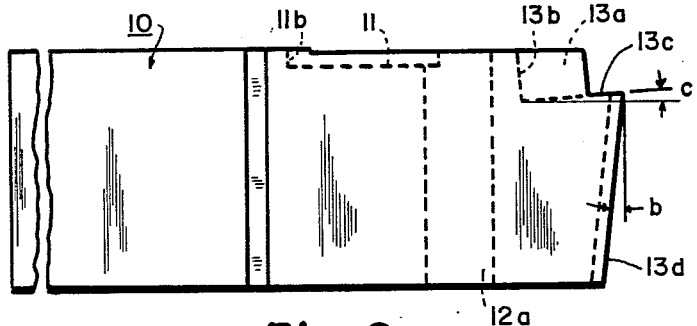
FIGURE 2 is a side view in elevation on the scale of and of the tool holder of FIGURE 1.
Figure 3:
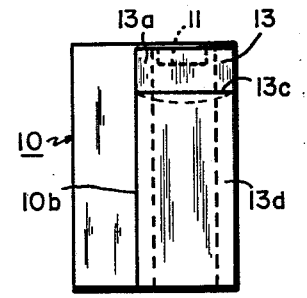
FIGURE 3 is a front end view in elevation on the scale of and of the tool of FIGURES 1 and 2.

Referring to FIGURES 1 to 3 of the drawings, I have illustrated a tool holder 10 of elongated, substantially rectangular shape that, along its longitudinal axis, has a greater vertical than transverse extent. The tool holder 10 has a shank portion for mounting it in a cutting machine or wheel and a front head or operating portion. At least one lateral or vertical side 10b of the mounting portion is shown as inwardly-offset with respect to a corresponding side of the shank portion to defined a thickness 10a of lesser extent than the thickness of the shank portion. As shown particularly in FIGURE 1, a side shoulder connects the offset lateral side 10b of the head portion of the tool holder 10 with respect to its shank portion, and has a backward inclination represented by angle $a$ that may be in the neighborhood of about 30°. The head portion is shown terminating in a vertically-downwardly-inwardly or backwardly-declining front end wall or face 13d whose vertical cant or slope is represented by $b$, and may be in the neighborhood of about 5°.

In the embodiment shown in FIGURES 1 to 6 and 13 to 15, an elongated top slot, groove or depression 11 is formed in the upper face of the head portion of the tool holder 10 and is defined by opposed, substantially planar, vertical lateral side wall portions 11a, a rounded back end wall portion 11b, and a front vertical bore 12 which extends centrally through and is open to the top face and behind a downwardly-offset shelf 13. As shown particularly in FIGURE 13, the bore 12 is provided with threads 12a to receive a cap screw 14. The top slot or groove 11 is adapted to cooperatively or slidably-receive a downwardly-projecting tongue portion 16 of a clamping element or part 15 (see FIGURES 6 and 13).

The shelf 13 is shown open to the top face of the head portion of the tool holder 10, as well as to its front end, and to corner and relatively short-length or minor opposed lateral sides adjacent the front end. A top face or ledge 13c of the shelf 13 is planar and inclines or declines downwardly-backwardly from the front end of the head portion, and has a slope represented by angle $c$ which may be in the neighborhood of about 5°. The top face or ledge 13c is surmounted or enclosed towards its back reaches by opposed vertical or lateral sides 13a that extend backwardly in a converging relation along the head portion and terminate in a rounded back connecting end portion 13b to define a substantially V-shaped slot with the top face 13c.

Figure 1A:
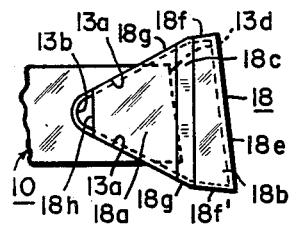
FIGURE 1A is a fragmental top view on the scale of and showing the front end portion of the tool of FIGURE 1 with a cutting element of my invention in position thereon.

The shelf 13 is adapted to adjustably-receive a carbide cutting element 18 that has a substantially complementary fitting relation therewith, see FIGURE 1A. A front edge 13d of the shelf 13 is shown as inclining horizontally-inwardly towards one minor lateral side of the head portion and as inclining-outwardly with respect to the opposite minor lateral side thereof; in other words, it defines an angle of less than 90° with respect to the one lateral side and defines an angle of greater than 90° with respect to the other minor lateral side. Such angle is indicated by $d$ in FIGURE 1 and may be in the neighborhood of about 5°.

The opposed major lateral sides 13a of the shelf 13 define an included angle $e$ of about 60° (30° on each side), as an optimum, but may define an included angle within a range of 30° to 90°.

Figure 4:
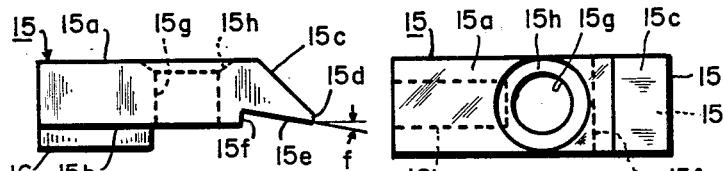
FIGURE 4 is a side view in elevation of a clamping element or part for use with the tool holder of FIGURES 1 to 3, inclusive, and on the same scale as such figures.

The clamping element or part 15 (see FIGURES 4 to 6) is shown provided with a planar top face 15a, opposed planar lateral side faces, and a pair of side-positioned planar under or bottom faces 15b. The front end portion of the clamping element 15 may, as shown in FIGURE 4, terminate in a clamping nose which is defined by a forwardly-downwardly sloped top face 15c, a front or vertical end face 15d, and a downwardly-offset front under or bottom face 15e that slopes backwardly-upwardly towards a shoulder 15f. The under face 15e defines an angle $f$ which may be in the neighborhood of about 10° and its front portion is adapted to provide an abutting flexible, clamping-down engagement with cutting element 18 or 20. The sloped and tapered-down shape of the front end portion of the clamping element 15 provides it with a somewhat flexible front nose portion for clamping engagement with the cutting element (see the embodiments of both FIGURES 13 and 17). A vertical bore 15g has a counter-sunk portion 15h at its upper end and extends downwardly through the clamping element 15, behind its clamping nose portion, but forwardly of a centrally-disposed and longitudinally and downwardly-extending tongue portion 16. The tongue portion 16 (see FIGURE 13) is adapted to be guidably-received within the slot portion 11 of the tool holder 10 in such a manner as to prevent lateral side movement, but to permit endwise movement of the clamping element 15 when it is in position with respect to the tool holder. Where endwise movement is also undesirable, it is eliminated by the construction shown in the prefered embodiment (see FIGURE 18).

Figure 7:
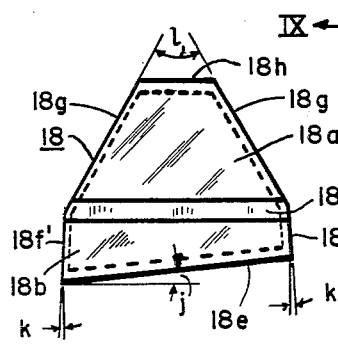
FIGURE 7 is a top plan view illustrating a preferred form of carbide cutting element constructed in accordance with my invention and on the same scale as FIGURES 1 to 6, inclusive.
Figure 8:
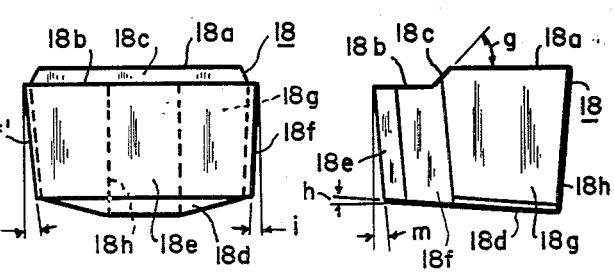
FIGURE 8 is a front end view in elevation on the scale of and of the cutting element of FIGURE 7.
Figure 9:
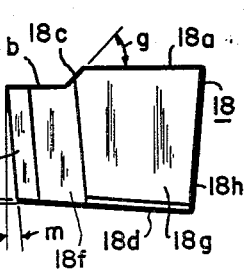
FIGURE 9 is a side view in elevation on the scale of and taken along the line IX—IV of FIGURE 7.

Referring to FIGURES 7 to 9, inclusive, the carbide cutting element 18 is illustrated as having a substantially planar upper-level, top back face portion 18a, and a lower-level, front, top face portion 18b that is connected to the face 18a by a backwardly-upwardly sloped shoulder 18c to define an integral chip breaker for the cutting element. The angular relationship of the shoulder 18c with respect to a face 18a is indicated by $g$ of FIGURE 9 and may be in the neighborhood of about 45°, depending upon the amount of chip breaking action required.

A planar bottom face 18d of the cutter element 18 slopes backwardly-downwardly, as defined by the angle $h$, and is substantially complementary with or corresponds to the angle $c$ defined by the ledge face 13c of the shelf 13 of the tool holder. The element 18 has corner and relatively short-length minor vertical or lateral sides 18f and 18f' that extend between corners of its front end face 18e and forward ends of major lateral side faces 18g. As shown particularly in FIGURE 8, the major lateral sides 18g and the minor lateral sides 18f and 18f' have an inward-downward vertical slope or inclination to define an angle i which may be in the neighborhood of about 3°. The front end face 18e of the cutting element is shown as sloping horizontally backwardly-inwardly towards one minor lateral side 18f and as sloping forwardly-outwardly towards the opposite minor lateral side 18f' to define an angle j which may be in the neighborhood of about 5°. The front face 18e defines a front cutting edge with the top face 18b and has a downward-backward or inward slope represented by the angle m which may be in the neighborhood of about 5°. As shown in FIGURE 7, the front or minor lateral sides 18f and 18f' decline slightly backwardly or horizontally-inwardly, as represented by the angles k which may be in the neighborhood of about 3° to provide withdrawal relief after the completion of a cutting operation. The major vertical or lateral side faces 18g extend backwardly in a converging relation, substantially complementary with respect to the lateral sides 13a of the head portion, and terminate in a vertical connecting planar back end face 18h. The included angle is represented by l.

Figure 10:
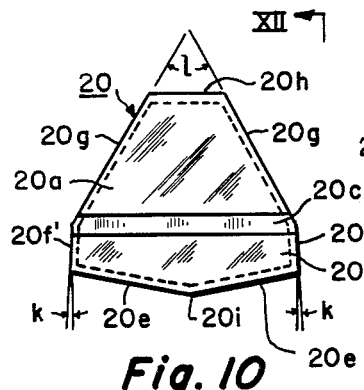
FIGURE 10 is a top plan view on the scale of FIGURE 7 of a modified form of carbide cutting element constructed in accordance with my invention.
Figures 11, 12:
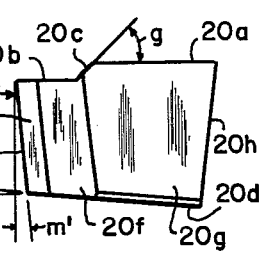
FIGURE 11 is a front view in elevation on the scale of and of the cutting element of FIGURE 10.
FIGURE 12 is a side view in elevation on the scale of and taken along the line XII—XII of FIGURE 10.

In FIGURES 10 to 12, inclusive, I have shown a modified form of carbide cutting element 20 whose portions 20a, 20c, 20d, 20g and 20h correspond respectively to 18a, 18c, 18d, 18g and 18h of the cutting element 18 of FIGURE 7. However, its top front face 20b has two forward or front face portions 20e which project forwardly of a central longitudinal axis of the cutting element and meet at a forward apex 20i. Thus, the minor lateral sides 20f and 20f' are of equal extent and define similar angles with respect to the front faces 20e. In this construction, chip breaker shoulder 20c may be similar to the shoulder 18c of the embodiment of FIGURE 7, or may have a more extending slope, varied as desired, for a particular cutting operation. The slope of angle m' of FIGURE 12 is shown in the neighborhood of 10° as compared to the 5° slope of the angle m of FIGURE 9.

Figure 5:
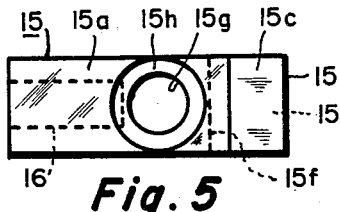
FIGURE 5 is a top plan view of the clamping element of and on the same scale as FIGURE 4.
Figure 6:
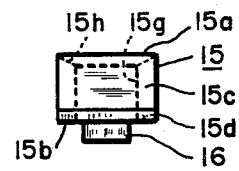
FIGURE 6 is a front end view in elevation on the same scale as and of the clamping element or part of FIGURES 4 and 5.
Figures 13, 14:
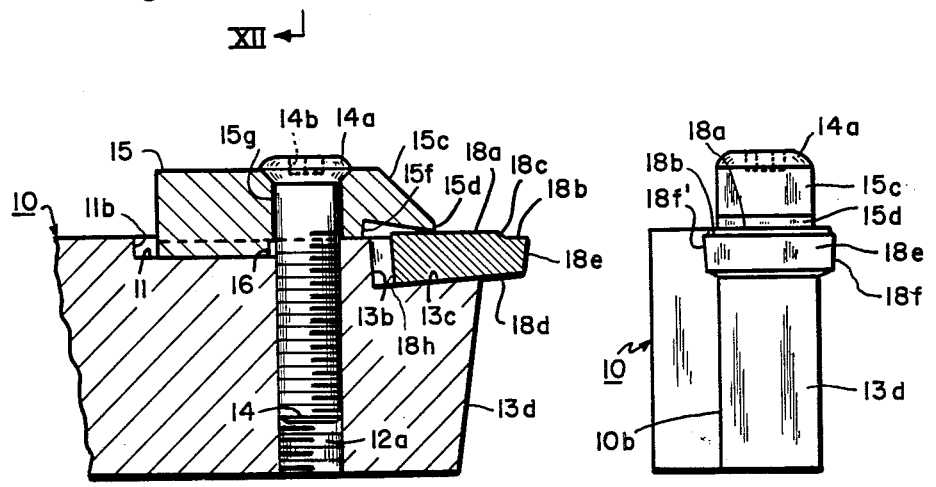
FIGURE 13 is a fragmental section in elevation through a tool assembly constructed in accordance with my invention on the scale of the previous figures, taken along the line XIII—XIII of FIGURE 15, and showing the various parts and elements in an assembled or mounted relation with respect to each other, such that the assembly is ready for effecting a cutting operation.
FIGURE 14 is a front end view in elevation on the scale of and of the assembly of FIGURE 13.
Figure 15:
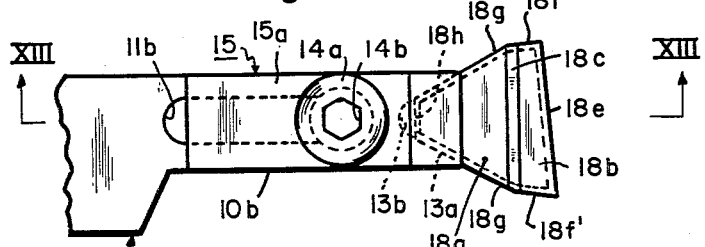
FIGURE 15 is a top plan view on the scale of and of the assembly of FIGURE 13.

FIGURES 13 to 15, inclusive, show a tool assembly constructed in accordance with my invention, utilizing the elements illustrated in FIGURES 1, 5 and 7 of the drawings. It will be noted that the cutting element 18 is adjustable as to its angular relationship on the shelf 13 and is securely-clamped or held-down in such a relation by the clamping element 15, as secured by the cap screw 14 in the mounting portion of the tool holder 10. In this connection, the nose portion of the clamping element 15 has a somewhat flexible engagement with the top face of the cutting element 18. In its secured relationship the element 18, however, is securely held, both against lateral movement as well as against lengthwise or axial movement with respect to the tool holder, in the first instance, primarily by its positioning between the side walls 13a and, in the second instance, primarily by reason of the wedgng engagement of its bottom face 18d with the top face 13c of the shelf 13. The tool holder 10 may be of heat-treated steel construction as well as the clamping element 15. The heat-treating can be closely maintained and retained, since the cutting element 18 is separately formed and is not brazed to the tool holder 10. In other words, the tool holder is not subjected to localized heat deterioration due to the securing-on of the cutting element or due to the removal of the cutting element.

As shown particularly in FIGURES 14 and 15, the cutting element 18 projects both laterally and axially-forwardly of the tool holder 10 and its supporting shelf 13 for working engagement with the work piece being cut or grooved. It will be apparent that the type of forward cutting edge of the cutting element may be varied in any desired manner for a particular type of cutting operation. In this connection, FIGURES 10 to 12 illustrate a modified form of cutting element. Although the cutting assembly of my invention is primarily devised for use with a tool holder mounted in a cutting-off machine, it is also applicable for use in a cutting wheel, wherein a group of cutting elements are mounted to project radially in a circumferentially-spaced relation with each other from a cutting-off wheel.

As shown, the cap screw 14 has a threaded stem, and a head portion 14a that is adapted to fit within the counter-sunk bore portion 15h of the clamping element 15, in order to provide a maximum clearance above the assembly. The head portion 14a may have an Allen wrench slot 14b inset therein for tightening it down and loosening it.

In FIGURES 1A, 13 and 15, the overhang of the cutting element or blade part 18 is shown greatly exaggerated. For example, in FIGURES 1A and 15, the lateral side overhang may be in the neighborhood of about .020 of an inch and in FIGURE 13, the forward end overhang may be in the neighborhood of about .010 of an inch. It will be apparent in the construction above described, using a tongue and groove fitting between the clamping piece 15 and the shank of the tool holder 10 that longitudinal sliding movement can be effected; this is advantageous where different size cutting tips or elements 18 or 20 are to be used with the same holder. However, in this arrangement, there is a positive positioning as to lateral, transverse or side movement of the clamping part or element 15.

In the preferred embodiment of my invention shown particularly in FIGURES 16 to 22, inclusive, sole reliance on the clamping cap screw or bolt 14 (see FIGURE 13) for resistance to longitudinal or endwise movement is eliminated. That is, in the preferred embodiment, I employ a pin and hole interfitting relation between clamping element or part 35 and the shank of tool holder 30 (see FIGURE 19), so that the element 35 has a positive positioning, both from the standpoint of lateral and longitudinal movement, and against pivotal movement in combination with cap screw 34.

For simplicity of illustration of the embodiment of FIGURES 16 to 22, I have employed reference numerals of the thirty series and have used last portions of the reference numerals which for the most part correspond to last portions of the numerals of similar parts or elements of previously described embodiments. In addition, I have employed the same alphabetic indications for angular relationships in the embodiment of FIGURES 16 to 22 as employed in the embodiments of FIGURES 1 to 15, inclusive. The angles b, c, e, f, g, h, i, k, l and m of the construction of FIGURES 16 to 22 are shown as the same as corresponding angles of the other figures. However in the embodiment of FIGURES 16 to 22, the angle a is illustrated as 45° instead of 30°, the angle d as 2° instead of 5°, and the angle j as 3° instead of 5°.

Figure 16:
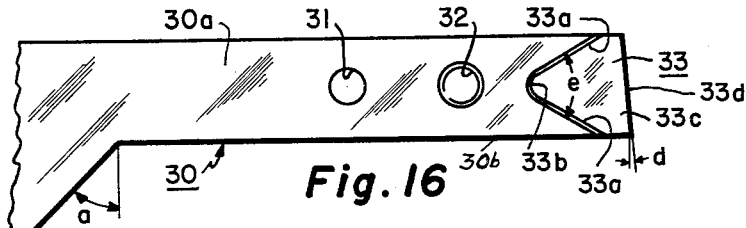
FIGURE 16 is a top plan view showing a preferred tool holder construction of my invention.
Figure 17:
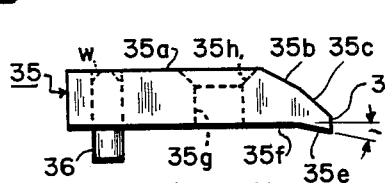
FIGURE 17 is a side view in elevation of a clamping element or part for use with the tool holder of FIGURE 16 and on the same scale as such figure.
Figure 18:
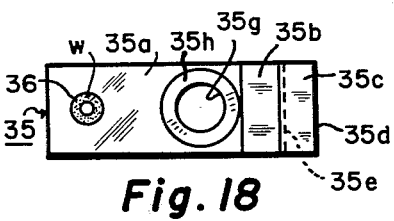
FIGURE 18 is a top plan view of the clamping element for and on the same scale as the holder of FIGURE 17.

Referring particularly to FIGURES 16, 17 and 18, the tool holder 30 is provided with a shank portion for mounting it on a cutting machine and, at its forward end, terminates in a mounting portion having, as shown, a lateral or vertical side 30b that is inwardly-offset to define a thickness of lesser extent than the shank portion. A threaded bore 32 projects vertically-centrally-downwardly through the forward end portion of a planar top face 30a and a pin-receiving bore or hole portion 31 is spaced backwardly therefrom and is also open to the face 30a to receive a pin 36 of clamping piece or element 35. A shelf 33 is shown open to the top face 30a of the head portion of the tool holder 30, as well as to its front end, and to corner and relatively short-length or opposed lateral sides adjacent the front end. A top face or ledge 33c of the shelf 13 is planar and inclines or declines backwardly (see also FIGURE 19) to receive a bottom face 38d of the cutting element 38. The ledge 33c is enclosed along its back reaches by opposed, backwardly-converging, lateral sides 33a that terminate in a back connecting end portion 33b to define a substantially V-shaped slot. A front edge of the shelf 33 is shown as inclining towards one lateral side of the head portion, as in the previously described embodiments.

Figure 19:
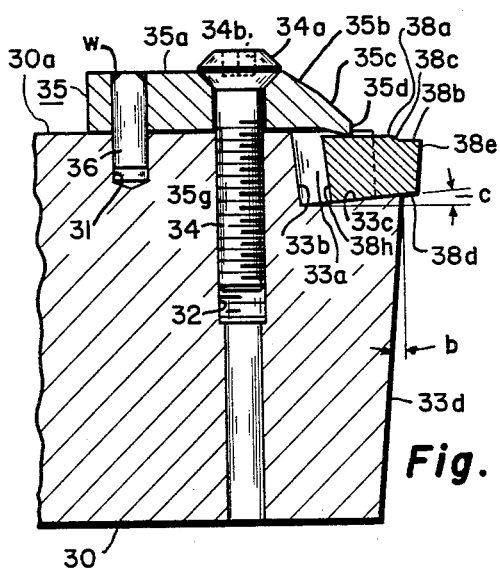
FIGURE 19 is a fragmental section in elevation through the preferred tool assembly on the scale of FIGURES 16 to 18, taken along the line XIX—XIX of FIGURE 20, and showing the parts ready for effecting a cutting operation.
Figure 20:
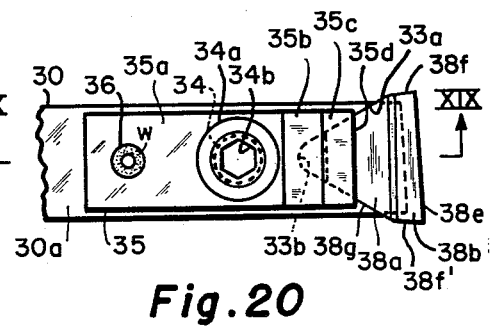
FIGURE 20 is a fragmental top plan view on the scale of and showing the assembly of FIGURE 19.

The clamping element or part 35 is shown as having a top planar face 35a and an opposed bottom planar face 35f. A pin 36 is mounted to project downwardly beyond the underface 35f within a bore adjacent the back end portion of the clamping element 35 and may be secured therein by weld metals w. A forward bore 35g which is outwardly-enlarged or counter-sunk at 35h is adapted to slidably-receive and position the cap screw or securing means 34, as shown in FIGURE 19. Near its forward end, the top face 35a has a downwardly-sloped face portion 35b which is connected to an extreme forward top face portion 35c of greater slope. A front nose or vertical end 35d connects the face 35c with a forwardly-downwardly sloped under face 35e to provide a flexible clamping engagement for holding the cutting element 38 in position on the mounting portion of the tool holder 30.

Figure 22:
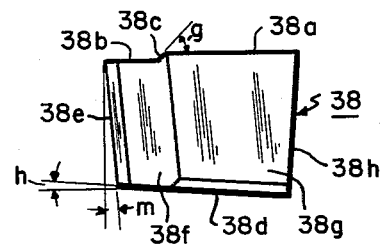
FIGURE 21 is a top plan view and FIGURE 22 is a side view in elevation of a carbide cutting element constructed in accordance with my invention and suitable for use in the assembly of FIGURES 19 and 20, but is on a slightly enlarged scale with respect to such figures.
Figure 21:
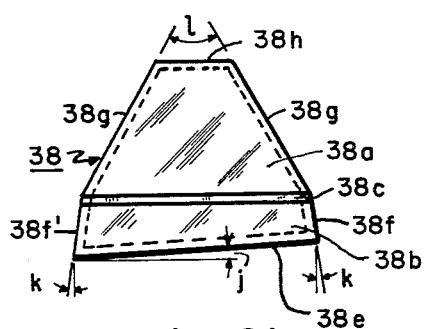

The cutting element of FIGURES 21 and 22 is substantially the same in construction as the cutting element 18 of FIGURES 7 to 9. It has a top planar back face 38a, a lower level front top face portion 38b, a connecting chip-breaking shoulder portion 38c, a backwardly-sloped underface 38d which is adapted to have a complementary fitting with the face 33c of the tool holder 30, opposed minor lateral side faces 38f and 38f', major lateral side faces 38g, and a vertical back connecting face 38h. Other suitable types of cutting elements, such as the element of FIGURES 10 to 12 may be used with the assembly of FIGURE 19.

In assembling the construction of FIGURES 16 to 22, the cutting element or part 38 is slid to a suitable operation position on the top ledge face 33c of the tool holder, the clamping element or part 35 is then positioned on the top face 38a of the tool holder and its pin 36 inserted within the bore 31. Then, the cap screw 34 is positioned, as shown in FIGURE 9, and tightened down to securely clamp the cutting element 38 in a desired cutting position.

What I claim is:

1. In a cutting-off tool assembly for limited clearance spacing cutting-off operations on a work piece, such as for cutting-off or grooving a metal shape and the like, and which utilizes in combination a substantially elongated tool holder having shank and head portions, a cutting element and a clamping element for removably-securing said cutting element in an operating position on the head portion of said holder; a construction wherein the head portion has a downwardly-offset shelf open to a top face thereof to receive said cutting element thereon, said shelf has a planar ledge face that declines downwardly-backwardly from a front face of the head portion, said ledge face has a front portion that is open to the front face of and to adjacent corners and opposite lateral side faces of the head portion, said shelf is enclosed on its lateral sides from its open front portion by extending lateral side walls that extend longitudinally-backwardly in a converging relation along the head portion to define a substantially V-shaped slot with said ledge face, said cutting element has a front face defining at least one front cutting edge with its top face for engagement with the work piece and has adjacent opposed minor lateral side faces connected to the front face by corner edges; said cutting element has a substantially planar under face that declines downwardly-backwardly therealong in a complementary manner with respect to the ledge face of said shelf, and has major lateral side faces that extend longitudinally-backwardly from said minor lateral side faces in a converging relation and in a complementary manner with respect to the lateral side walls of said shelf, so that said cutting element when placed on said shelf will be restrained against lateral side movement by cooperation with the lateral side walls of said shelf; said head portion has a threaded bore therein backwardly of said shelf and open to its top face, said clamping element has a bore therethrough behind its front end portion, a threaded cap screw is adapted to extend through the bore of said clamping element into the bore of the head portion to secure a front end portion of said clamping element in clamping engagement upon a top face of said cutting element for removably-securing said cutting element in position on said shelf, and a top face of said head portion and an under face of said clamping element have cooperating portions for retaining said clamping element in alignment with the head portion.

2. In a tool assembly as defined in claim 1 wherein said cutting element has a top shoulder portion that is integral therewith and that is backwardly-offset with respect to its front cutting edge to define a chip breaker therefor.

3. In a tool assembly as defined in claim 1 wherein said head portion has at least one lateral side that is inwardly-offset with respect to the same lateral side of the shank portion of said tool holder.

4. In a tool assembly as defined in claim 1 wherein said portions of the top face of said head portion and the under face of said clamping element for retaining said clamping element in alignment with said head portion are cooperating tongue and groove portions that are located behind the bores of said head portion and said clamping element.

5. In a tool assembly as defined in claim 1 wherein said portions of the top face of said head portion and the under face of said clamping element for retaining said clamping element in alignment with said head portion are cooperating pin and hole portions.

6. In a tool assembly as defined in claim 1 wherein the backward declination of the ledge face of said shelf and of the under face of said cutting element is within a range of about 3° to 8° with respect to a horizontal axis of said tool holder.

7. In a tool assembly as defined in claim 1 wherein said front cutting edge of said cutting element defines an angle of greater than 90° with one minor lateral side face and an angle of less than 90° with respect to the other minor lateral side face thereof.

8. In a tool assembly as defined in claim 1 wherein, said cutting element has a substantially planar downwardly-offset top face extending backwardly from said front cutting edge, and has a backwardly-upwardly sloped chip-breaking shoulder from said offset top face that terminates backwardly in a higher level substantially planar top face.

9. In a tool assembly as defined in claim 1 wherein said minor lateral side faces of said cutting element slope slightly inwardly-backwardly from said front cutting edge to provide withdrawal relief after the completion of a cutting operation.

10. In a tool assembly as defined in claim 1 wherein the front face of said cutting element defines a front cutting edge that projects longitudinally-forwardly thereof into a mid-apex from the opposite minor lateral sides of said cutting element.

11. In a tool assembly as defined in claim 1 wherein, said tool holder is of heat-treated steel construction, said clamping element is also of heat-treated steel construction, said cutting element is of rough-finished metal carbide construction, and the front end portion of said clamping element is defined by a downwardly-longitudinally-forwardly inclined top face, and by a downwardly-offset front under face for abutting engagement with the top face of said cutting element.

12. In a tool assembly as defined in claim 11 wherein said offset front under face of said clamping element slopes upwardly in an angular relation with the top face of said cutting element and is connected to a back under face by a connecting shoulder portion.

13. An improved cutting-off element for a cutting-off tool assembly which comprises, a hard carbide body defined by opposed relatively-wide top and bottom faces and by relatively-narrow lateral side, front and back end faces; said top face having a substantially planar lower-level front portion defining at least one front cutting edge and corner edges with said front end faces and said lateral side faces, said top face having a substantially planar upper-level back portion connected to said front portion by a cross-extending chip-breaking shoulder portion, said lateral side faces having opposed minor and major side portions, said minor side portions extending backwardly from said corner edges and connected to said major side portions adjacent opposite lateral ends of said chip-breaking shoulder portion, said major side portions extending backwardly along said upper level back portion in a transversely-inwardly converging relation with each other to said back end face, and said bottom face inclining downwardly-backwardly between said front and back end faces and defining an increased thickness of said body towards said back end portion.

14. An improved cutting element as defined in claim 13 wherein, said front end face inclines backwardly from one of said minor side portions towards the other of said minor side portions, and the other of said minor side portions is of shorter extent than the one minor side portion.

15. An improved cutting element as defined in claim 13 wherein said front end face has a pair of portions extending forwardly from said minor side portions into a substantially centrally-positioned front apex edge.

16. In a cutting-off tool assembly for limited clearance spacing cutting-off operations on a work piece, such as for cutting-off or grooving a metal shape, and which utilizes in combination a tool holder having a head portion, a carbide cutting element and a clamping element for removably-securing the cutting element in an operating position on the head portion of said holder; a construction wherein the head portion has a downwardly-backwardly-offset planar shelf open to a top face thereof to receive said cutting element thereon, said shelf has a front portion that is open to the front face of and adjacent corners and opposite minor lateral sides of the head portion and is enclosed along its major lateral sides from its open front portion by lateral side walls that extend longitudinally-backwardly in a converging relation along the head portion to define a V-shaped slot, said cutting element has a front face defining a front cutting edge with its top face for engagement with the work piece and has adjacent opposed minor lateral side faces connected to the front faces by corner edges, said cutting element has a planar under face that declines downwardly-backwardly therealong to fit in a complementary manner on said shelf, said cutting element has major lateral sides that are complementary with the backwardly-converging lateral sides of said shelf to cooperate therewith in restraining said cutting element against lateral sidewise movement, the head portion has a threaded bore therein backwardly of said shelf and open to its top face and has a hole therein backwardly of said threaded bore, said clamping element has a bore therethrough behind its front end portion and a pin thereon in a spaced relation behind said bore, said pin of said clamping element being adapted to seat within the hole of the head portion to positively align said clamping element with respect to the tool holder, and a threaded cap screw is adapted to extend through the bore of said clamping element into the threaded bore of the head portion to securely mount said clamping element in clamping engagement upon the top face of the mounting portion for removably-securing said cutting element in position on said shelf.

17. In a tool assembly as defined in claim 16 wherein said clamping element has a forward nose portion defined by downwardly-forwardly sloped top face portions of different inclination, by a vertical end portion, and by a backwardly-sloped front under face portion.

18. In a tool assembly as defined in claim 16 wherein said cutting element has a downwardly-offset top front face along its cutting edge and has an upper level back top face connected by a chip-breaking shoulder with said front face, and the head portion has a front face that slopes downwardly-backwardly from said shelf towards its under face.

References Cited in the file of this patent
UNITED STATES PATENTS

| | | |
|---|---|---|
| 1,443,752 | Lindmark | Jan. 30, 1923 |
| 1,700,610 | Drees | Jan. 29, 1929 |
| 1,865,148 | Slade | June 28, 1932 |
| 2,964,833 | Novkov | Dec. 20, 1960 |
| 3,025,847 | Miller | Mar. 20, 1962 |
| 3,090,104 | Novkov | May 21, 1963 |